F. WOODGATES & T. W. JOURDAN.
REPAIRING PATCH AND REPAIRING MATERIAL FOR PNEUMATIC TIRES.
APPLICATION FILED DEC. 17, 1908.

995,106.

Patented June 13, 1911.

Witnesses:-
C. H. Crawford
E. Schallinger

Inventors:-
Frederick Woodgates
Thomas Walter Jourdan
By B. Singer Attorney

UNITED STATES PATENT OFFICE.

FREDERICK WOODGATES AND THOMAS WALTER JOURDAN, OF TIVERTON, ENGLAND.

REPAIRING-PATCH AND REPAIRING MATERIAL FOR PNEUMATIC TIRES.

995,106.  Specification of Letters Patent. Patented June 13, 1911.

Application filed December 17, 1908. Serial No. 468,088.

*To all whom it may concern:*

Be it known that we, FREDERICK WOODGATES, residing at Mount View, Tiverton, and THOMAS WALTER JOURDAN, residing at Alsia Brook, Tiverton, both in the county of Devon, in that part of the United Kingdom called England, subjects of His Majesty the King of the United Kingdom of Great Britain and Ireland, have invented new and useful Improvements in Repairing-Patches and Repairing Material for Pneumatic Tires and the Like, of which the following is a specification.

This invention relates to improvements in repairing patches for pneumatic tires and the like.

Repairing patches for pneumatic tires and the like usually consist of a plurality of layers of rubber or a certain kind of fabric adapted to be cemented to the tire and to close a slot, puncture or any damaging opening therein.

An object of this invention is to provide layers, the surfaces of said layers being so constructed that a separation of these layers by frictional heat or some other reason can not easily occur.

Figure 1:
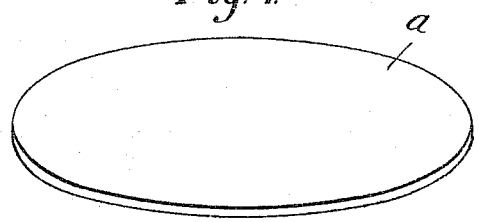
Figure 2:
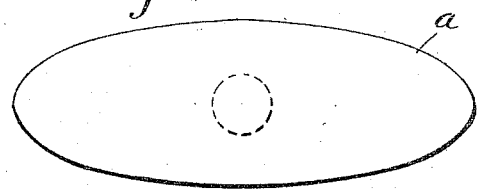
Figure 3:
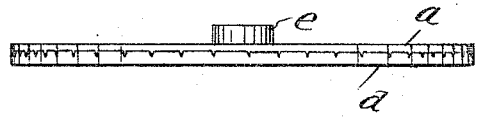
Figure 4:
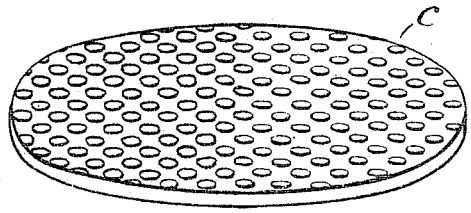
Figure 5:
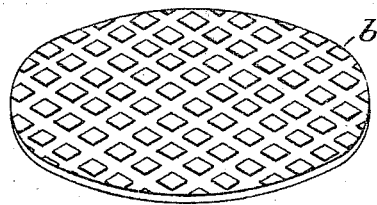
Figure 6:
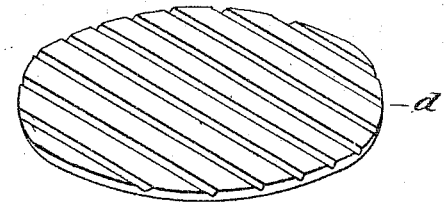

In the drawing:—Figure 1 is a perspective view of one part of the patch. Fig. 2 is a top plan view of an embodiment of this invention. Fig. 3 is a side elevation of the same. Fig. 4, Fig. 5 and Fig. 6 are various modifications respectively of another part of the patch.

The improved patch mainly consists of two elements. *a*, Fig. 1, designates a thin sheet of soft rubber adapted to be cut in any desired shape. The other sheet consists of vulcanized rubber and preferably is somewhat thicker than the soft rubber sheet. This sheet of vulcanized rubber is provided on one of its surfaces with projections, as shown in Figs. 4 and 5, or grooves are provided thereon as indicated in Fig. 6. The two parts forming the patch are united by means of a cold vulcanizing fluid, the projections of the sheet of vulcanized rubber extending into the body of the soft rubber sheet, or said soft rubber sheet projecting into the grooves and formed on the surface of the vulcanized sheet. These projections or grooves may have any desired size or shape and it will be understood that the invention is not limited to the form shown in parts *b*, *c*, and *d*, respectively. By this partial mutual penetration of the two members forming the patch, a very firm amalgamation is obtained and the entire patch is then secured to the inside of the tire by means of cement or by some other suitable means. A plug *e* may be secured to the sheet of soft rubber and extends through the puncture or hole in the tire, thereby obtaining a more perfect closure of these openings.

We claim:—

1. A repairing patch for pneumatic tires and the like comprising in combination a thin sheet of soft unvulcanized rubber and a sheet of vulcanized rubber provided with a roughened surface, said thin sheet lying against the roughened surface and being adhered thereto by means of a cold vulcanizing fluid.

2. A patch for pneumatic tires and the like comprising in combination, a thin sheet of soft unvulcanized rubber and a thicker sheet of vulcanized rubber, said last named sheet being provided with projecting portions on one side, said thin sheet lying against said projecting portions and being adhered thereto by means of a cold vulcanizing fluid.

In testimony whereof we have signed our names to this specification in the presence of two subscribing witnesses.

FREDERICK WOODGATES.
THOMAS WALTER JOURDAN.

Witnesses:
V. LAZARUS,
O. DAY.